UNITED STATES PATENT OFFICE.

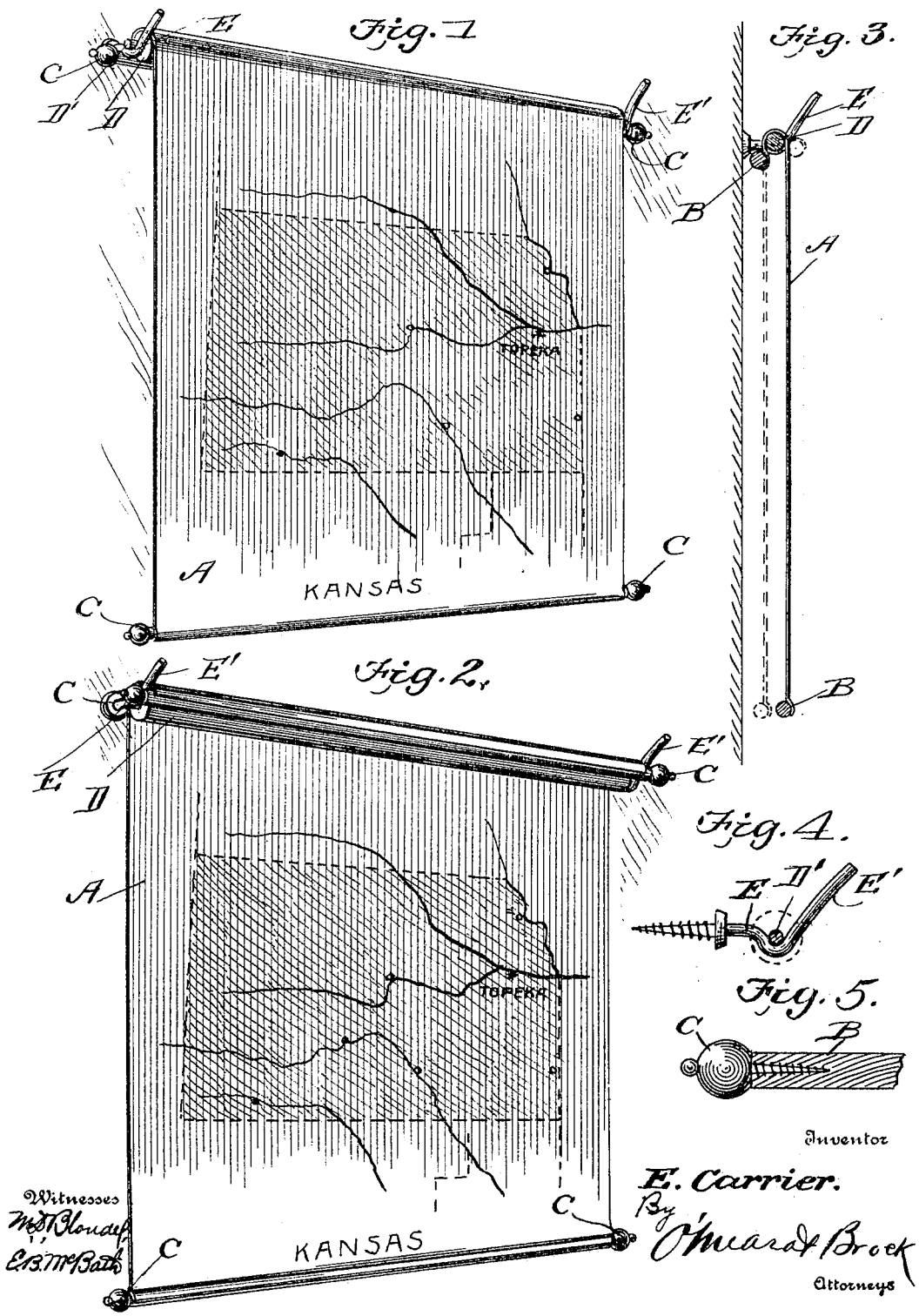

EMANUEL CARRIER, OF GREENLEAF, KANSAS.

WALL-MAP.

No. 798,660.　　　Specification of Letters Patent.　　　Patented Sept. 5, 1905.

Application filed July 26, 1904. Serial No. 218,273.

*To all whom it may concern:*

Be it known that I, EMANUEL CARRIER, a citizen of the United States, residing at Greenleaf, in the county of Washington and State of Kansas, have invented a new and useful Improvement in Wall-Maps, of which the following is a specification.

This invention relates generally to maps, and more particularly to an improved construction of wall-map and means for suspending the same, the object of the invention being to provide a map which can be quickly and easily reversed, so that either side can be readily examined.

As a rule where maps are printed upon both sides of the sheet it is necessary to remove the map from the hanger and turn it around bodily and replace it upon the hanger, which operation requires considerable time and it is often inconvenient in accomplishment.

The object of my invention is to avoid these difficulties; and therefore it consists, essentially, in printing the maps upon opposite sides of the sheet in reverse positions and in arranging the said double-faced maps upon a roller and also in providing said double-faced maps with weights, so that the said maps can be quickly and easily pulled up or down over the roller for the purpose of presenting either side to the observer.

The invention consists also in certain details of construction hereinafter fully described, and pointed out in the claim.

In the drawings forming a part of this specification, Figure 1 is a perspective view of a map constructed and supported in accordance with my invention. Fig. 2 is a similar view showing the reverse side of the sheet. Fig. 3 is a sectional view, the dotted lines showing the positions the parts assume when the reverse side of the map is exposed. Fig. 4 is a detail view of the supporting-bracket, and Fig. 5 is a detail view showing the end of the stick carrying the weight.

In carrying out my invention I employ a double-faced map A, the maps upon the opposite sides of the sheet being printed in reverse order or upside down—that is, the top side of one map is directly opposite the bottom side of the map upon the reverse side of the sheet. The double-faced map A has sticks B B attached to the top and bottom edges of the same, said sticks carrying weights C at their opposite ends, which weights are preferably finished in ornamental form. The map rests upon and is adapted to travel over a roller D, having pintles D', which rest in the brackets E, screwed to the wall or any other suitable rigid object, said brackets having forwardly and upwardly extending portions E', the purpose of which will hereinafter appear.

When the map is arranged in the position shown in Fig. 1, it will be noted that the stick B engages the under side of the bracket and the weights carried by the lower stick hold the map in a straight and flat position. When it is desired to view the map upon the opposite side of the sheet, the bottom stick is grasped and moved upwardly after the manner of raising a curtain, and the weights C, carried by the upper stick, immediately cause the map to travel over the roller D, and that stick which was formerly the upper one and engaged under the side of the bracket E descends and becomes the bottom stick, and what was formerly the bottom stick becomes the top stick and engages the outwardly-projecting portions E' of the brackets E, as most clearly shown in Fig. 2. The maps being printed in reverse order, it is obvious that the map presented to view will be supported in the proper position. Thus it is unnecessary to remove the map from the hanger, and the map can be quickly and easily reversed by simply moving the bottom portion of the map upwardly after the manner of raising a curtain, and by this simple movement the map is reversed and properly supported.

It will of course be understood that the word "map" is used in its broadest sense and that any imprinted matter desired may be placed on the sheet A and that charts, pictures, and the like may be displayed as well as maps of various countries.

Having thus fully described my invention, what I claim as new, and desire to secure by Letters Patent, is—

The combination with a rotatable roller and a reversible map adapted to travel over said roller, of brackets having a screw-end portion and having their opposite ends inclined upwardly, said brackets supporting the rollers, and weighted sticks at each end of the map adapted to engage the brackets on opposite sides of the roller, as and for the purpose set forth.

EMANUEL CARRIER.

Witnesses:
JOHN ATKINSON,
WM. H. NOLL.